(12) United States Patent
Sakaguchi et al.

(10) Patent No.: US 6,493,194 B1
(45) Date of Patent: Dec. 10, 2002

(54) THIN FILM MAGNETIC HEAD

(75) Inventors: Masaya Sakaguchi, Osaka (JP);
Hiroyasu Tsuji, Osaka (JP); Satoru Mitani, Osaka (JP); Tadashi Kimura, Osaka (JP); Hiroyoshi Sekiguchi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/539,051

(22) Filed: Mar. 30, 2000

(30) Foreign Application Priority Data

Mar. 31, 1999 (JP) .............................. 11-092567

(51) Int. Cl.⁷ .............................. G11B 5/127; G11B 5/39
(52) U.S. Cl. ........................................ 360/322; 360/327
(58) Field of Search ................................ 360/319, 320, 360/321, 322, 324.12, 327, 327.3, 327.31

(56) References Cited

U.S. PATENT DOCUMENTS

| 4,789,910 | A | * | 12/1988 | Otsuka et al. | ............... 360/113 |
| 5,337,203 | A | * | 8/1994 | Kitada et al. | ............... 360/113 |
| 5,508,866 | A | * | 4/1996 | Gill et al. | .................... 360/113 |
| 5,535,077 | A | * | 7/1996 | Saito et al. | .................. 360/113 |
| 5,617,276 | A | * | 4/1997 | Takada et al. | ............... 360/113 |
| 5,748,415 | A | * | 5/1998 | Christner et al. | ........... 360/113 |
| 5,872,691 | A | * | 2/1999 | Fukuyama et al. | ......... 360/113 |
| 5,914,839 | A | * | 6/1999 | Matsuzono et al. | ......... 360/113 |
| 5,936,812 | A | * | 8/1999 | Terunuma et al. | .......... 360/113 |
| 5,966,274 | A | * | 10/1999 | Suzuki | ....................... 360/113 |
| 6,064,552 | A | * | 5/2000 | Iwasaki et al. | ............. 360/113 |
| 6,078,484 | A | * | 6/2000 | Sakakima | ................... 360/324 |
| 6,115,216 | A | * | 9/2000 | Yoda et al. | .................. 360/113 |
| 6,209,193 | B1 | * | 4/2001 | Hsiao | ......................... 360/113 |
| 6,243,241 | B1 | * | 6/2001 | Kanai | ....................... 360/324.11 |
| 6,252,748 | B1 | * | 6/2001 | Yamanaka et al. | .......... 360/317 |
| 6,266,218 | B1 | * | 7/2001 | Carey et al. | ........... 360/324.12 |
| 6,324,037 | B1 | * | 11/2001 | Zhu et al. | ............... 360/324.12 |

FOREIGN PATENT DOCUMENTS

JP  09305931  11/1997

* cited by examiner

Primary Examiner—David L. Ometz
Assistant Examiner—Dzung Nguyen
(74) Attorney, Agent, or Firm—RatnerPrestia

(57) ABSTRACT

A thin film magnetic head which includes a magnetoresistive layer selectively formed; a magnetic bias layer sandwiching said magnetoresistive layer; a pair of leads for detecting magnetic resistance; and a cap layer formed under the lead between the magnetoresistive layer. This configuration enables to accurately specify a magnetic response region by both ends of the cap layers, concentrating the current from the lead onto the magnetic response region through a tip of the cap layer for improving a S/N ratio.

13 Claims, 4 Drawing Sheets

THIN FILM MAGNETIC HEAD

FIELD OF THE INVENTION

The present invention relates to the field of thin film magnetic heads that employ a magnetoresistive layer and which are used as reproduction heads for magnetic disk devices.

BACKGROUND OF THE INVENTION

In response to the increasing recording density of hard disk drives, reproduction heads are being developed with a narrower reproduction track width and greater reproduction output than those of conventional thin film magnetic heads. One of these new reproduction heads is a MR head which utilizes the magnetoresistive effect, in which electric resistance changes in response to changes in an externally applied magnetic field. Types using materials with greater magnetoresistive effect are called GMR heads.

FIG. 4 is a sectional view of a part of a conventional thin film magnetic head. In FIG. 4, an insulating base layer 21 made such as of alumina, a lower shield magnetic layer 22 made of soft magnetic material such as nickel and iron, a first insulating layer 23 made of a non-magnetic material such as alumina, and a magnetoresistive layer 24 are formed on a substrate (not illustrated) made such as of alumina/titanium carbide. In the magnetoresistive layer 24, a magnetic response region 24a is for generating normal signals and an unwanted signal generating region 24b generates unwanted signals when the current flows through this region. A magnetic bias layer 25, made such as of hard magnetic film and antiferromagnetic film, for applying a magnetic bias to the magnetoresistive layer 24; lead 26; and a second insulating layer 27 for covering the lead 26, etc. are also formed.

The end face of the tip of the lead 26 is tapered, and a first taper close to the magnetoresistive layer 24 is formed at a large angle θ, and a second taper far from the magnetoresistive layer 24 is formed at a smaller angle φ. For simplification, the upper shielding magnetic layer formed on the second insulating layer 27 is not illustrated.

In the prior art shown in FIG. 4, the magnetic bias layer 25 is disposed in a clearance created on the first insulating layer 23, and the magnetoresistive layer 24 is formed on the magnetic bias layer 25 and the clearance. The tip of the lead 26 contacts the magnetoresistive layer 24 beyond the end of the magnetic bias layer 25.

In general, the magnetic response region 24a is approximately equivalent to the area between the tips of the leads 26. Strictly speaking, however, it is not electrically equivalent to the area between the tips of the leads 26 because the current from the lead 26 flows not only from the tip of the lead 26 but also extensively in the lengthwise direction of the lead 26.

In order to satisfy the increasing demand for higher recording density, the magnetic head needs to achieve a narrower reproduction track width by narrowing the magnetic response region but without degrading the sensitivity and S/N ratio. Accordingly, the current needs to be fed efficiently only to the magnetic response region, which is equivalent to the width of a track, without any current leakage to other regions.

In the aforementioned prior art, the width of the magnetic response region is accurately specified by forming the large angle θ at the tip of the lead 26 against the main face of the magnetoresistive layer 24. The coverage of the second insulating layer 27 at the step portion is improved by forming a portion following the tip of the lead with a smaller angle φ for a gentle slope.

However, the magnetoresistive layer 24 is formed crossing the step portion at the tip of the magnetic bias layer 25, and this causes a different concern. More specifically, the magnetic bias layer 25 needs to be disposed as close as possible to the magnetic response layer 24a in order to efficiently apply a magnetic bias to the magnetic response layer 24a in the above conventional configuration. On the other hand, the tip of the magnetic bias layer 25 and the tip of the lead 26 also come closer when the magnetic bias layer 25 and the magnetic response layer 24a are in closer proximity. This requires that the lead 26 be thickened at the portion close to the magnetic bias layer 25, resulting in an overall increase in the thickness of the lead 26. Greater thickness at the tip of the lead 26, which is thickness of a slope portion having the angle θ, causes problems in coverage of the second insulating layer 27 at the step portion covering the lead 26, and occurrence of cracks.

Also in the conventional configuration, the lead 26 directly contacts the magnetoresistive layer 24, and this requires that a material for the lead 26 be selected for good adhesivity to the magnetoresistive layer 24 without causing a reaction with the magnetoresistive layer 24, resulting in many restrictions on its practical use.

The present invention aims to provide a thin film magnetic head which allows the accurate definition of the magnetic response region, to reduce current to the magnetoresistive layer at regions other than the magnetic response region, and to increase the S/N ratio by increasing the proportion of current flowing in the magnetic response region; and to offer a structure that is easy to manufacture.

SUMMARY OF THE INVENTION

The thin film magnetic head of the present invention includes an insulating base layer; a lower shield magnetic layer formed on the insulating base layer; a first insulating layer formed on the lower shield magnetic layer; a magnetoresistive layer formed selectively over at least a portion of the first insulating layer; a magnetic bias layer formed sandwiching the magnetoresistive layer for applying magnetic bias to the magnetoresistive layer; a pair of leads formed over at least a portion of the magnetic bias layer for detecting a change in electric resistance of the magnetoresistive layer by an external magnetic field; a non-magnetic cap layer formed under the lead between the lead and the magnetoresistive layer; a second insulating layer at least covering the magnetoresistive layer, magnetic bias layer, and pair of leads; and an upper shield magnetic layer formed on the second insulating layer.

In the above configuration, the non-magnetic cap layer under the leads accurate specification of the width of the magnetic response region, allowing the current to effectively flow from the lead to the magnetic response region.

Moreover, the thin film magnetic head of the present invention includes an insulating base layer; a lower shield magnetic layer formed on the insulating base layer; a first insulating layer formed on the lower shield magnetic layer; a magnetoresistive layer formed over at least a portion of the first insulating layer; a magnetic bias layer formed sandwiching the magnetoresistive layer for applying magnetic bias to the magnetoresistive layer; a non-magnetic cap layer formed on a main face of the magnetoresistive layer; a pair of leads formed over at least a portion of the magnetic layer for detecting a change in electric resistance of the magnetoresistive layer by an external magnetic field; a second insulating layer at least covering the magnetoresistive layer, magnetic bias layer; and pair of leads; and an upper shield magnetic layer formed on the second insulating layer. The portion of the non-magnetic cap layer under the lead is thicker than the portion of the non-magnetic cap layer not under the lead.

This configuration enables to effectively protect the main face of the magnetoresistive layer in the manufacturing process, and, at the same time, the thick non-magnetic cap layer under the leads enables to accurately specify the width of the magnetic response region, allowing the current to effectively flow is from the lead to the magnetic response region.

Still more, the thin film magnetic head of the present invention includes an insulating base layer; a lower shield magnetic layer formed on the insulating base layer; a first insulating layer formed on the lower shield magnetic layer; a magnetoresistive layer formed over at least a portion of the first insulating layer; a magnetic bias layer formed sandwiching the magnetoresistive layer for applying magnetic bias to the magnetoresistive layer; a first non-magnetic cap layer formed on a main face of the magnetoresistive layer; a pair of leads formed over at least a portion of the magnetic bias layer for detecting a change in electric resistance of the magnetoresistive layer by an external magnetic field; a second non-magnetic cap layer under the lead between the lead and the first non-magnetic cap layer; a second insulating layer at least covering the magnetoresistive layer, magnetic bias layer, and pair of leads; and an upper shield magnetic layer formed on the second insulating layer.

The above configuration enables to demonstrate stronger effect by selecting appropriate materials for the first and second non-magnetic cap layers. In addition, a material for the first non-magnetic cap layer is selectable with respect to increased adhesivity to the second non-magnetic cap layer and preventing reaction between the magnetoresistive layer and second non-magnetic cap layer.

Still more, the above thin film magnetic head of the present invention has the configuration that the top face of the non-magnetic cap layer under the lead and the main face of the magnetic bias layer are approximately leveled. This reduces a step at the top end of the magnetic bias layer, enabling to make the lead thinner, and solve problems of the coverage by the second insulating layer and occurrence of cracks, and so on.

Still more, the above thin film magnetic head of the present invention has the configuration that opposing end faces of the non-magnetic cap layers under the lead form an angle $\theta 1$ against the main face of the magnetoresistive layer, and the top end face of the pair of leads form an angle $\phi 1$ against the main face of the non-magnetic cap layer. In addition, $\theta 1$ and $\phi 1$ satisfy the relation of $\phi 1 < \theta 1 < 90°$. This enables to easily and accurately specify the magnetic response region using the top ends of the non-magnetic cap layers.

Still more, the above thin film magnetic head of the present invention has the configuration that the sheet resistance of a thin portion of the non-magnetic cap layer sandwiched with the tips of the leads on the main face of the magnetoresistive layer is higher than the sheet resistance of the magnetoresistive layer. This enables to supply a larger proportion of current to the magnetoresistive layer than that to the thin non-magnetic cap layer, allowing to increase the S/N ratio.

Still more, the above thin film magnetic head of the present invention has the configuration that the specific resistivity $\rho 1$ of the first non-magnetic cap layer and the specific resistivity $\rho 2$ of the second non-magnetic cap layer satisfy $\rho 1 > \rho 2$. This enables to prevent the current supplied to the second non-magnetic cap layer from reaching the first non-magnetic cap layer adjacent to the magnetoresistive region, allowing increased current directed to the magnetoresistive region for increasing the S/N ratio.

Still more, the above thin film magnetic head of the present invention has the configuration that the specific resistivity $\rho 1$ of the first non-magnetic cap layer, the specific resistivity $\rho 2$ of the second non-magnetic cap layer, and the specific resistivity $\rho 3$ of the third non-magnetic cap layer satisfy $\rho 1 > \rho 3 > \rho 2$. By specifying the relation of specific resistivity in each layer, the current is effectively fed from the lead to the magnetoresistive region, allowing to increase the S/N ratio.

Still more, the above thin film magnetic head of the present invention has the configuration that a thickness t1 of the non-magnetic cap layer under the lead, a thickness t2 of the non-magnetic cap layer on the magnetoresistive layer at portions other than that under the lead satisfy $t2 < (t1-t2)$. This enables to limit the current flowing through the non-magnetic cap layer on the magnetoresistive layer and enhances the current flow at a portion of the non-magnetic cap layer under the lead, resulting in increasing the S/N ratio.

Still more, the above thin film magnetic head of the present invention has the configuration that a thickness t3 of the first non-magnetic cap layer and a thickness t4 of the second non-magnetic cap layer satisfy $t3 < t4$. This enables to relatively increase the current flowing to the magnetoresistive region, resulting in increasing the S/N ratio.

Still more, the above thin film magnetic head of the present invention has the configuration that the sheet resistance of the non-magnetic cap layer formed under the pair of leads is lower than the sheet resistance of the magnetoresistive layer. This enhances the current from the magnetic bias layer to be fed to the magnetic response region through the tip of the non-magnetic cap layer, reducing the current flowing to the unwanted signal generating region, and thus increasing the S/N ratio.

As described above, the thin film magnetic head of the present invention selectively provides the magnetic bias layer on both sides of the magnetoresistive layer, and the pair of leads are connected to the magnetoresistive layer through the non-magnetic cap layer provided under the lead. This enables to accurately specify the magnetoresistive region using the tip of the non-magnetic cap layer, and also enables to effectively feed the current from the lead to the magnetoresistive region by effectively concentrating the current on the tip of the non-magnetic cap layer.

Still more, a first non-magnetic cap layer formed over an entire main face of the magnetoresistive layer and a second non-magnetic cap layer provided under the lead between the lead and the first non-magnetic cap layer enable to broaden a choice of material for the non-magnetic cap layer, realizing a thin film magnetic head with high accuracy and high reliability.

Still more, if a main face of the non-magnetic cap layer under the lead and a main face of the magnetic bias layer are approximately leveled, the lead may be formed almost without any step. This allows to thin the lead, making the step seen from the second insulating layer smaller compared to the prior art.

In addition, the angle between the end face of the non-magnetic cap layer and the main face of the magnetoresistive layer may be made large. This makes the current efficiently flow only to the magnetic response region, improving the S/N ratio. At the same time, a gentle slope at the lead tip prevents an insufficient coverage or cracks of the insulating film covering the lead at the step portion.

In each of the above configurations, a relation among a sheet resistance between the non-magnetic cap layer and magnetoresistive layer, specific resistivity, and film thickness may be appropriately set to increase the current fed to the magnetic response region for improving the S/N ratio.

The non-magnetic cap layer described in the present invention is formed on an uppermost layer of the magnetoresistive layer. An expression of the magnetoresistive layer may include the non-magnetic cap layer in some descriptions. However, for easier understanding in the present invention, the magnetoresistive layer refers to an overlayed film having a magnetoresistive effect, and a non-magnetic cap layer refers to a layer formed on the magnetoresistive layer. Accordingly, the non-magnetic cap layer also refers to the layer formed over a part of the overlayed film having magnetoresistive effect, a non-magnetic cap layer configured with multiple layers. Furthermore, the term non-magnetic cap layer is used regardless of a purpose or effect on an overlayed film having a magnetoresistive effect.

DESCRIPTION OF THE PREFERRED EMBODIMENT

Exemplary embodiments of the present invention are described below with reference to FIGS. 1 to 3.

First Exemplary Embodiment

Figure 1:
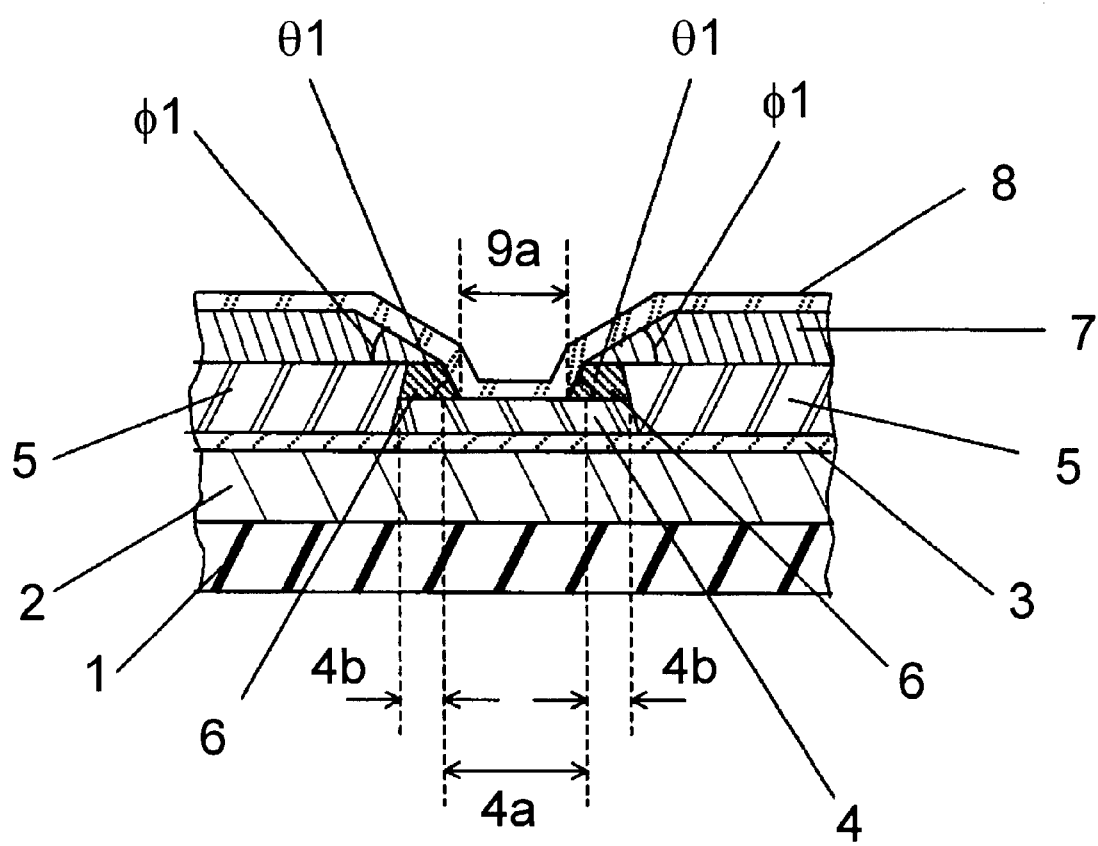
FIG. 1 is a sectional view of a part of a thin film magnetic head in accordance with a first exemplary embodiment of the present invention.

FIG. 1 is a sectional view of a part of a thin film magnetic head in a first exemplary embodiment of the present invention. FIG. 1 shows a reproduction head portion; the recording head portion is omitted from the Figure.

In FIG. 1 an insulating base layer 1 made such as of an alumina film, a lower shield magnetic layer 2 made of soft magnetic material such as nickel and iron alloy, a first insulating layer 3, and a magnetoresistive layer 4 are formed on a substrate (not illustrated) made such as of alumina/titanium carbide. In the magnetoresistive layer 4, a magnetic response region 4a is for generating normal signals in response to changes in an externally applied magnetic field, and an unwanted signal generating region 4b generates unwanted signals. The thin film magnetic head in the first exemplary embodiment further includes a magnetic bias layer 5, made of a hard magnetic material, for applying a magnetic bias to the magnetic response region 4a; a non-magnetic cap layer 6; a pair of leads 7 formed over at least a portion of the magnetic bias layer 5 for detecting the changes in electric resistance of the magnetoresistive layer 4 induced by the external magnetic field; and a second insulating layer 8. A region 9a is defined by opposing end faces of the non-magnetic cap layer 6. An angle θ1 is the angle between the end face of the non-magnetic cap layer 6 and the main face of the magnetoresistive layer 4, and the angle φ1 is the angle between the tip of the lead 7 and the main face of the non-magnetic cap layer 6.

An upper shield magnetic layer is required on the second insulating layer 8 for the magnetic head, but this is omitted in FIG. 1.

A feature of the thin film magnetic head in the first exemplary embodiment of the present invention is that the non-magnetic cap layer 6 is disposed under the lead 7. This configuration enables accurate specification of the region 9a sandwiched by the end faces of the non-magnetic cap layer 6. However, the reproduction track width is not strictly equal to the region 9a, it may extend to the slightly wider magnetic response region 4a. This is because the current flows not only from the tip of the lead 7, but extensively from other portions when the current flows to the magnetic response region 4a from the lead 7 through the non-magnetic cap layer 6.

In addition to the above configuration, the step between the main face of the non-magnetic cap layer 6 and the main face of the magnetic bias layer 5 can be reduced by approximately leveling the main faces of the non-magnetic cap layer 6 and bias layer 5. This enables the lead 7 to be made thinner, reducing the problem of coverage of the second insulating layer 8 at the step portion, and occurrence of cracks, If the angle θ of the tip of the non-magnetic cap layer 6 is increased in the first exemplary embodiment, the current from the lead 7 is concentrated at the tip of the non-magnetic cap layer 6, enabling reduction of the current flowing to the unwanted signal generating region 4b. This increases the S/N ratio by proportionally increasing the current from the inner tip of the non-magnetic cap layer 6 to the magnetic response region 4a.

In addition to the above configuration, opposing end faces of a pair of non-magnetic cap layers 6 form the angle θ1 against the surface of the magnetoresistive layer 4, and the tip of the lead 7 form the angle φ1 against the main face of the non-magnetic cap layer 6. The angles θ1 and φ1 satisfy the relation of $\phi1<\theta1<90°$. This enables to reduce the problems of coverage of the second insulating film 8 and occurrence of cracks at the step portion.

Also in addition to the above configuration, lower specific resistivity for the non-magnetic cap layer 6 than the specific resistivity of the magnetoresistive layer 4 enhances the current from the magnetic bias layer 5 to be fed to the magnetic response region 4a through the tip of the non-magnetic cap layer 6. This enables to reduce the current fed to the unwanted signal generating region 4b, further increasing the S/N ratio.

In addition to the above configuration in the first exemplary embodiment, the sheet resistance of the non-magnetic cap layer 6 may be made lower than the sheet resistance of the magnetoresistive layer 4 in order to accelerate the current fed from the magnetic bias layer 5 to flow to the non-magnetic cap layer 6 rather than the magnetoresistive layer 4. This increases the current flowing to the magnetic response region 4a through the tip of the non-magnetic cap layer 6, and also reduces the current flowing to the unwanted signal generating region 4b. Consequently, the S/N ratio increases.

In FIG. 1, the cross-sectional shape of the magnetoresistive layer 4 is trapezoidal, but the shape is not limited to a trapezoid. It is apparent that the same effects are achievable as long as the shape is selectively formed.

Second Exemplary Embodiment

Figure 2:
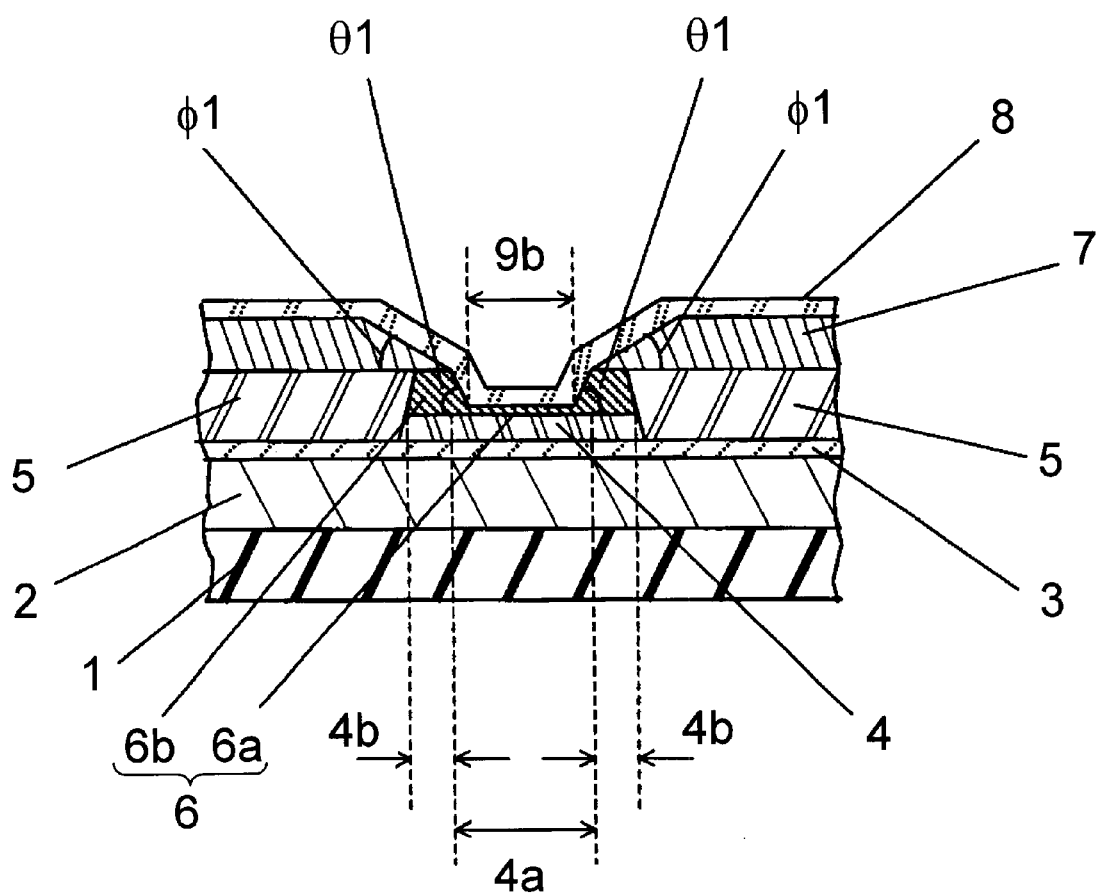
FIG. 2 is a sectional view of a part of a thin film magnetic head in accordance with a second exemplary embodiment of the present invention.

FIG. 2 is a sectional view of a part of a thin film magnetic head in a second exemplary embodiment of the present invention. The same reference numerals are given to the parts equivalent to those in FIG. 1, and thus their explanation is omitted. Only the different points are described below.

A point which differs in FIG. 2 from the first exemplary embodiment in FIG. 1 is that the non-magnetic cap layer 6 includes a thin non-magnetic cap layer 6a and thick non-magnetic cap layer 6b under the lead 7 made of the same material. The region 9b is an area between both ends of the thick non-magnetic cap layer 6b. Also in this case, the current spreads slightly, and thus the magnetoresistive region 4a is a little wider than the region 9b. However, the reproduction track width can be sufficiently narrowed with ease.

The upper shield magnetic layer is necessary on the second insulating layer 8 as the magnetic head, but this is omitted in FIG. 2.

The non-magnetic cap layer 6a on the magnetoresistive layer 4 is thinner than the non-magnetic cap layer 6b under the lead 7, and this enables the current flow through the non-magnetic cap layer 6b to the magnetic response region 4a of the magnetoresistive layer 4 to be enhanced, and suppresses the current flow to the thin non-magnetic cap layer 6a which has higher electric resistance.

The above configuration enables the non-magnetic cap layer 6 to protect the main face of the magnetoresistive region 4a also during the manufacture, realizing a thin film magnetic head with high reliability.

The step between the main face of the non-magnetic cap layer 6b and the main face of the magnetic bias layer 5 can be reduced by approximately leveling the main faces of both layers. This enables to reduce the step, the same as in the first exemplary embodiment, reducing the problems of coverage of the second insulating layer 8 and occurrence of cracks at the step portion.

Furthermore, opposing end faces of a pair of non-magnetic cap layers 6b form the angle $\theta 1$ against the surface of the magnetoresistive layer 4, and the tip of the lead 7 form the angle $\phi 1$ against the main face of the non-magnetic cap layer 6. The angles $\theta 1$ and $\phi 1$ satisfy the relation of $\phi 1 < \theta 1 < 90°$. This enables the current to be concentrated at the tip of the non-magnetic cap layer 6b, the same as in the first exemplary embodiment, thus further reducing the problems of coverage of the second insulating film 8 and occurrence of cracks at the step portion.

A thickness t2 of the thin cap layer 6a and a thickness t1 of the thick non-magnetic cap layer 6b are set to satisfy the relation of $t2 < (t1 - t2)$. This makes it possible to accurately specify the width of the magnetic response region 4a to further increase the current from the end of the thick non-magnetic cap layer 6b to the magnetic response region 4a.

Provision of a higher sheet resistance for the thin non-magnetic cap layer 6a on the magnetic response region 4a than the sheet resistance of the magnetic response region 4a makes it possible to concentrate the current from the lead 7 onto the magnetic response region 4a.

Provision of a lower sheet resistance for the non-magnetic cap layer 6b under the lead 7 than the sheet resistance of the magnetoresistive layer 4 enhances the current from the magnetic bias layer 5 to be fed to the non-magnetic cap layer 6b rather than the magnetoresistive layer 4. This increases the current flowing to the magnetic response region 4a through the tip of the non-magnetic cap layer 6, reducing the current flowing to the unwanted signal generating region 4b.

In FIG. 2, the cross-sectional shape of the magnetoresistive layer 4 is trapezoidal, but the shape is not limited to a trapezoid. It is apparent that the same is effects are achievable as long as the shape is selectively formed.

Third Exemplary Embodiment

Figure 3:
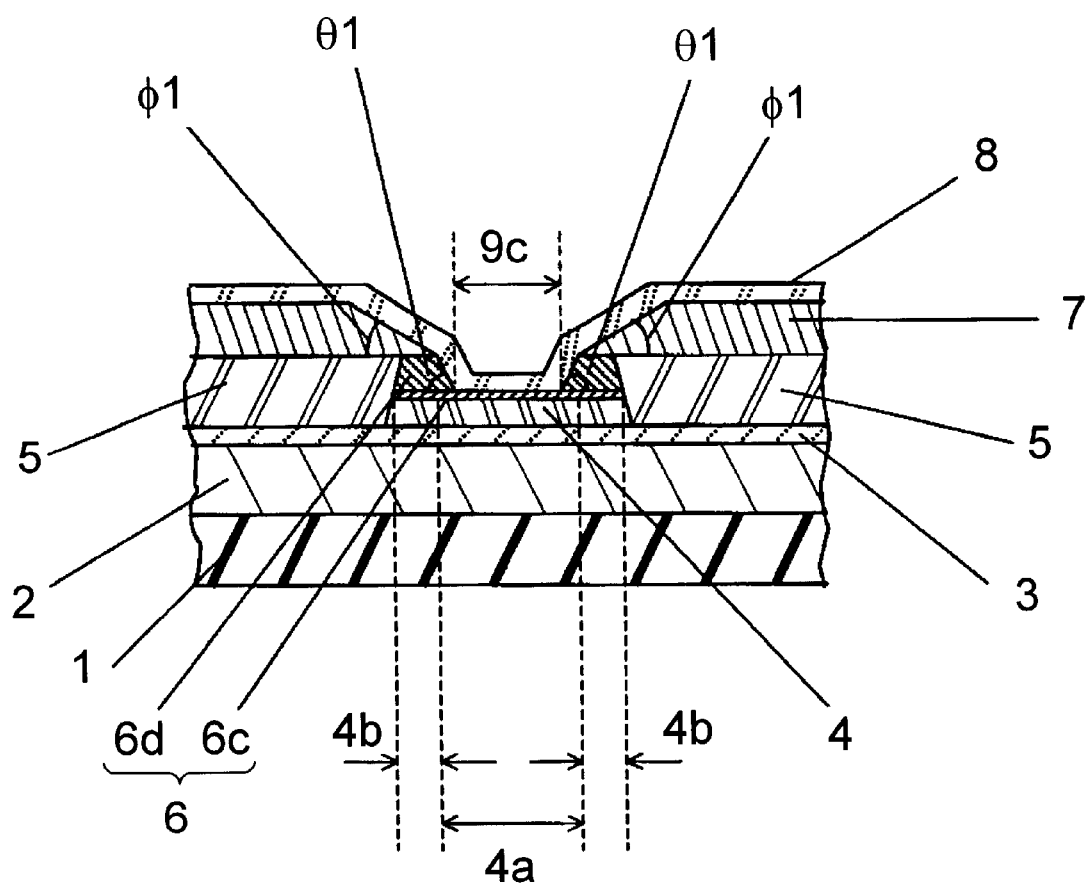
FIG. 3 is a sectional view of a part of a thin film magnetic head in accordance with a third exemplary embodiment of the present invention.
Figure 4:
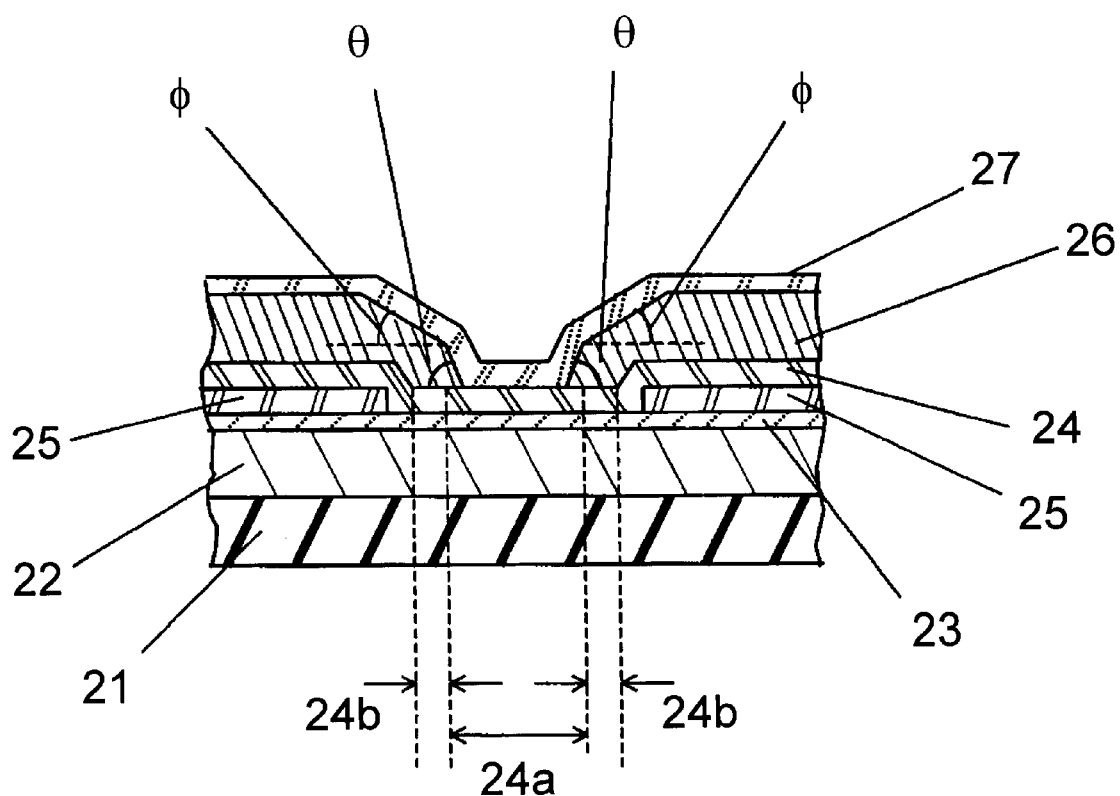
FIG. 4 is a sectional view of a part of a conventional thin film magnetic head.

FIG. 3 is a sectional view of a part of a thin-film magnetic head in a third exemplary embodiment of the present invention. In FIG. 3, parts same as those in FIG. 2 are given the same reference numerals and thus their explanation is omitted. Only the points that differ are described below. A point which differs in FIG. 3 from the second exemplary embodiment in FIG. 2 is that the non-magnetic cap layer 6 includes a first non-magnetic cap layer 6c and a second non-magnetic cap layer 6d made of different materials. The first non-magnetic cap layer 6c is formed on the entire main face of the magnetoresistive layer 4, and the second non-magnetic cap layer 6d is formed under the lead 7.

The upper shield magnetic layer is required on the second insulating layer for the magnetic head, but this is omitted in FIG. 3.

With the above configuration, materials for the first non-magnetic cap layer 6c and second non-magnetic cap layer 6d may be respectively and separately selected. This makes it possible to achieve a higher performance thin film magnetic head, although the manufacturing processes become more complicated than for the second exemplary embodiment. For example, a material with high resistance and good adhesivity to the magnetoresistive layer 4 is selected for making the thin first non-magnetic cap layer 6c, and a material with low resistance is selected for making the thick second non-magnetic cap layer 6d. This makes it possible to more effectively direct the current from the lead 7 to the magnetic response region 4a. In this case, no problem occurs when the current from the lead 7 flows through the high resistance first non-magnetic cap layer 6c, and then to the magnetic response region 4a, even if the resistance of the first non-magnetic cap layer 6c is somewhat high, as long as the first non-magnetic cap layer 6c is thin.

The step between the main face of the second non-magnetic cap layer 6d and the main face of the magnetic bias layer 5 can be reduced by approximately leveling the main faces of the second non-magnetic cap layer 6d and magnetic bias layer 5. This enables to reduce the step, as in the first and second exemplary embodiments, reducing the problems of coverage of the second insulating layer 8 and occurrence of cracks at the step portion.

Furthermore, opposing end faces of a pair of non-magnetic cap layers 6d form the angle $\theta 1$ against the main face of the magnetoresistive layer 4, and the tip of the lead 7 form the angle $\phi 1$ against the main face of the non-magnetic cap layer 6. The angles $\theta 1$ and $\phi 1$ satisfy the relation of $\phi 1 < \theta 1 < 90°$. This enables the current to be concentrated at the tip of the non-magnetic cap layer 6d, the same as in the first and second exemplary embodiments, thus further reducing the problems of coverage of the second insulating film 8 and occurrence of cracks at the step portion.

Materials for the first non-magnetic cap layer 6c and the second non-magnetic cap layer 6d are selected to satisfy the relation of $\rho 1 > \rho 2$ when a specific resistivity of the first non-magnetic cap layer 6c is $\rho 1$, the specific resistivity of the second non-magnetic cap layer 6d is $\rho 2$, and a specific resistivity of the magnetoresistive layer 4 is $\rho 3$. This makes it possible to increase the current to the magnetic response region 4a. Furthermore, if materials are selected to satisfy the relation of ρ1>ρ3>ρ2, the current flowing through the lead 7 and magnetic bias layer 5 flows first through the second non-magnetic cap layer 6d, and then to the magnetic response layer 4a.

Provision of a lower sheet resistance for the non-magnetic cap layer 6d under the lead 7 than the sheet resistance of the magnetoresistive layer 4 enhances the current from the magnetic bias layer 5 to be fed to the non-magnetic cap layer 6d rather than the magnetoresistive layer 4. This increases the current flowing to the magnetic response region 4a through the tip of the non-magnetic cap layer, reducing the current flowing to the unwanted signal generating region 4b.

In FIG. 3, the cross-sectional shape of the magnetoresistive layer 4 is trapezoidal, but the shape is not limited to a trapezoid. It is apparent that the same effects are achievable as long as the shape is selectively formed.

The thin film magnetic head of the present invention as described above utilizes the magnetoresistive effect, and is thus provided with the non-magnetic cap layer under the lead to which the current flows for detecting changes in magnetoresistance in the magnetoresistive layer.

This configuration allows a large angle to be formed at the end face of the thick non-magnetic cap layer under the lead, and thus the edge can be accurately etched to accurately specify the magnetoresistive region.

A slope from the magnetoresistive layer to the lead is formed in accordance with a large angle at the tip of the non-magnetic cap layer, and then the tip of the lead is formed with a small angle. This makes it possible to reduce the problems of coverage of the insulating layer covering the lead, and occurrence of cracks at the step portion.

The large angle θ at the tip of the non-magnetic cap layer makes it possible to reduce the current from the lead to the unwanted signal generating region, and in turn relatively increases the current from the inner tip of the non-magnetic cap layer to the magnetic response region. Accordingly, the S/N ratio can be increased.

In addition to the above configuration, the non-magnetic cap layer may be made thicker under the lead, and thinner at portions other than that under the lead, i.e., over the magnetic response region; or the cap layer may include the first non-magnetic cap layer formed on the main face of the magnetoresistive layer and the second non-magnetic cap layer formed under the lead between the lead and the first non-magnetic cap layer. This further reinforces the effect.

The thin film magnetic head of the present invention is thus particularly effective for further high-density magnetic recording medium characterized by narrow recording track widths.

What is claimed is:

1. A thin film magnetic head comprising:
  a base layer;
  a magnetoresistive layer formed over at least a portion of said base layer;
  a magnetic bias layer sandwiching said magnetoresistive layer, said magnetic bias layer for applying magnetic bias to said magnetoresistive layer;
  a pair of leads formed over at least a portion of said magnetic bias layer for detecting a change in electric resistance of said magnetoresistive layer by an external magnetic field;
  a conductive non-magnetic cap layer under one of said leads, said cap layer being formed between said lead and said magnetoresistive layer; and
  a second insulating layer covering at least said magnetoresistive layer, said magnetic bias layer, and said pair of leads.

2. A thin film magnetic head comprising:
  a base layer; a magnetoresistive layer formed over at least a portion of said base layer;
  a magnetic bias layer sandwiching said magnetoresistive layer, said magnetic bias layer for applying magnetic bias to said magnetoresistive layer;
  a conductive non-magnetic cap layer formed on a main face of said magnetoresistive layer;
  a pair of leads formed over a portion of said conductive non-magnetic cap layer for detecting a change in electric resistance of said magnetoresistive layer by an external magnetic field; and
  a second insulating layer covering at least said magnetoresistive layer, said magnetic bias layer, and said pair of leads;
  wherein portions of said conductive non-magnetic cap layer under said leads is thicker than portions of said conductive non-magnetic cap layer not under said leads.

3. A thin film magnetic head comprising:
  a base layer;
  a magnetoresistive layer formed over at least a portion of said base layer;
  a magnetic bias layer sandwiching said magnetoresistive layer, said magnetic bias layer for applying magnetic bias to said magnetoresistive layer;
  a first conductive non-magnetic cap layer formed on a main face of said magnetoresistive layer;
  a pair of leads formed over at least a portion of said magnetic bias layer for detecting a change in electric resistance of said magnetoresistive layer by an external magnetic field;
  a second conductive non-magnetic cap layer under one of said leads, said second conductive non-magnetic cap layer being formed between said lead and said first conductive non-magnetic cap layer; and
  a second insulating layer covering at least said magnetoresistive layer, said magnetic bias layer, and said pair of leads.

4. The thin film magnetic head as defined in claims 1, 2, or 3, wherein an upper face of said conductive non-magnetic cap layer under said pair of leads and a main face of said magnetic bias layer are approximately leveled.

5. The thin film magnetic head as defined in claims 1, 2, or 3, wherein opposing end faces of said conductive non-magnetic cap layer under said pair of leads form an angle θ1 against a main face of said magnetoresistive layer; an end face of a tip of said pair of leads form an angle φ1 against a main face of non-magnetic said cap layer; and said angles θ1 and φ1 satisfy φ1<θ1<90°.

6. The thin film magnetic head as defined in claims 2 or 3, wherein a sheet resistance of said thin conductive non-magnetic cap layer formed at an area sandwiched by tips of said leads on a main face of said magnetoresistive layer is higher than a sheet resistance of said magnetoresistive layer.

7. The thin film magnetic head as defined in claim 3, wherein a specific resistivity ρ1 of a material configuring said first conductive non-magnetic cap layer and a specific resistivity ρ2 of a material configuring said second conductive non-magnetic cap layer satisfy ρ1>ρ2.

8. The thin film magnetic head as defined in claim 3, wherein a specific resistivity ρ1 of said first conductive non-magnetic cap layer, a specific resistivity $\rho 2$ of said second conductive non-magnetic cap layer, and a specific resistivity $\rho 3$ of said magnetoresistive layer satisfy $\rho 1 > \rho 3 > \rho 2$.

9. The thin film magnetic head as defined in claim 2, wherein a thickness t1 of said conductive non-magnetic cap layer under said leads, and a thickness t2 of said conductive non-magnetic cap layer at regions on said magnetoresistive layer other than that under said leads satisfy t2<(t1−t2).

10. The thin film magnetic head as defined in claim 3, wherein a thickness t3 of said first conductive non-magnetic cap layer and a thickness t4 of said second conductive non-magnetic cap layer satisfy t3<t4.

11. The thin film magnetic head as defined in claims 1, 2, or 3, wherein a sheet resistance of said conductive non-magnetic cap layer formed under said pair of leads is lower than a sheet resistance of said magnetoresistive layer.

12. The thin film magnetic head as defined in claim 1 further comprising a conductive non-magnetic cap layer formed on a main face of said magnetoresistive layer.

13. The thin film magnetic head as defined in claim 12, wherein a material for said conductive non-magnetic cap layer formed on a main face of said magnetoresistive layer is different from a material for said conductive non-magnetic cap layer formed under said leads.

* * * * *